United States Patent
Wu et al.

(10) Patent No.: US 6,493,380 B1
(45) Date of Patent: Dec. 10, 2002

(54) SYSTEM AND METHOD FOR ESTIMATING SIGNAL TIME OF ARRIVAL

(75) Inventors: Shiquan Wu, Ottawa (CA); Song Zhang, Nepean (CA); Xixian Chen, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/321,819

(22) Filed: May 28, 1999

(51) Int. Cl.[7] .............................. H04B 7/26; H04Q 7/20; G01S 3/02
(52) U.S. Cl. ........................ 375/224; 375/130; 342/417
(58) Field of Search ................................. 375/224, 226, 375/130, 141, 147, 136; 342/450, 457, 350, 357.06, 357.01, 386, 417

(56) References Cited

U.S. PATENT DOCUMENTS

| | | | |
|---|---|---|---|
| 4,169,245 A | | 9/1979 | Crom et al. |
| 4,397,031 A | | 8/1983 | Weber |
| 4,712,059 A | | 12/1987 | Labrum |
| 5,724,047 A | * | 3/1998 | Lioio et al. .................. 342/442 |
| 6,018,312 A | * | 1/2000 | Haworth .................... 342/353 |
| 6,040,800 A | * | 3/2000 | Raith et al. ................. 342/387 |
| 6,047,192 A | * | 4/2000 | Maloney et al. ............ 455/456 |
| 6,088,586 A | * | 7/2000 | Harverty .................... 455/422 |
| 6,184,829 B1 | * | 2/2001 | Slip ............................ 342/387 |
| 6,188,354 B1 | * | 2/2001 | Soliman et al. ............. 342/387 |
| 6,204,812 B1 | * | 3/2001 | Fattouche .................... 342/457 |
| 6,208,297 B1 | * | 3/2001 | Fattouche et al. .......... 342/450 |
| 6,249,252 B1 | * | 6/2001 | Dupray ....................... 342/450 |
| 6,249,542 B1 | * | 6/2001 | Kohli et al. ................. 375/150 |
| 6,266,014 B1 | * | 7/2001 | Fattouche et al. .......... 342/450 |
| 6,275,705 B1 | * | 8/2001 | Drane et al. ................ 455/456 |
| 6,330,452 B1 | * | 12/2001 | Fattouche et al. .......... 455/456 |

FOREIGN PATENT DOCUMENTS

WO      WO 98/10538      *   3/1998    ............ H04B/7/26

* cited by examiner

*Primary Examiner*—Chi Pham
*Assistant Examiner*—Dung X. Nguyen
(74) *Attorney, Agent, or Firm*—Paul Hashim

(57) ABSTRACT

A method for estimating a time delay including the steps of first, estimating a channel spectrum from a received signal and a known reference signal, second, extracting a virtual array structure from the estimated channel spectrum, and third, determining the signal time delay using the virtual array structure. Further, a system for estimating a time delay including a channel spectrum estimator, means for extracting a virtual array structure and means for determining the time delay is provided. The channel spectrum estimator is used for estimating a channel spectrum from a received signal and a known reference signal. The means for extracting a virtual array structure uses the estimated channel spectrum. The means for determining the time delay uses the virtual array structure.

22 Claims, 6 Drawing Sheets

SYSTEM AND METHOD FOR ESTIMATING SIGNAL TIME OF ARRIVAL

FIELD OF THE INVENTION

The invention relates generally to signal propagation delay estimation, and more particularly to signal propagation delay estimation using frequency domain techniques.

BACKGROUND OF THE INVENTION

Emergency 911 service is rapidly becoming important in today's society. One of the compelling reasons for using the existing landline emergency 911 system is the ability to trace the caller's location. Using databases in the telephone network switches, the caller's location is determined and made available to the emergency services. In the event the caller is unable to inform the operator of their location, the ability to trace the call is invaluable.

The explosive growth of mobile phones, however, causes complications for emergency 911 services. While mobile users may call the 911 operator just as they would using a landline phone, there is currently no ability to trace the location of the mobile caller. The emergency 911 operator can currently only trace the mobile call to the base station closest to the mobile caller is using.

Mobile systems with the ability to locate mobile callers are known as wireless enhanced 911 or E911 systems. One known approach to determine a mobile caller's location involves using an improved handset. The improved handset may incorporate a global positioning system (GPS) receiver to determine the mobile caller's location and then transmit the location to the emergency 911 operator. Another improved-handset may use signals from multiple base stations to determine the mobile caller's location. These handset improvements, however, involve improved handset circuitry that increases the cost of the handsets. Further, the extra circuitry requires extra battery power. Moreover, deployment of the improvement takes time since it depends on the users upgrading their handsets.

Another approach would not modify the handsets, thereby avoiding the drawbacks stated above. The so-called network approach involves modifying the base stations. One such approach involves angle of arrival techniques using improved antenna arrays at the base station. Another approach uses a rough determination of the mobile's transmission characteristics and compares these to a large database of the surrounding environment to determine a rough idea of the mobile's location. In the first approach, however, new antennas must be installed which may be expensive. In the second approach, maintaining the database is difficult since the environment changes readily.

There is, however, a network based approach that involves a minimum amount of hardware upgrade and does not require knowledge of the surrounding environment. The approach is known as Time Difference Of Arrival or TDOA. TDOA involves measuring the Time Of Arrive (TOA) of the mobile's signal at multiple base stations. The TOAs are then sent to the Central Office and subtracted to get a measurements of TDOA between base stations. These TDOA parameters are then used to locate the mobile's position using standard hyperbolic locating techniques.

Known TDOA systems estimate the TOA by correlating the received signal with a known reference. The accuracy of the TOA estimation is limited by the resolution of the correlation. Furthermore, multipath and interference may degrade the performance of this technique.

Clearly, there is a need to accurately estimate the Time Of Arrival for mobile signals in a multipath environment.

SUMMARY OF THE INVENTION

The invention is directed to an apparatus and method for accurately estimating the time of arrival of a received signal in a multipath environment.

An aspect of the invention is a method for estimating a time delay. The method includes the following steps. First, estimating a channel spectrum from a received signal and a known reference signal. Second, extracting a virtual array structure from the estimated channel spectrum. Third, determining the signal time delay using the virtual array structure.

Another aspect of the invention is a system for estimating a time delay. The system includes a channel spectrum estimator, means for extracting a virtual array structure and means for determining the time delay. The channel spectrum estimator is used for estimating a channel spectrum from a received signal and a known reference signal. The means for extracting a virtual array structure uses the estimated channel spectrum. The means for determining the time delay uses the virtual array structure.

An advantage of the invention is the ability to accurately determine a time delay of a received signal in a multipath environment. In many environments multipath effects can be significant, thus the ability to accurately determine the time delay of a received signal can be difficult using existing systems.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

First, a general overview of various embodiments of the invention is provided. Generally speaking, one way to locate a wireless communications device, such as a mobile phone, is to do a time difference of arrival (TDOA) estimation and use triangulation to estimate the mobile's location. The TDOA estimate is preferably obtained by estimating the time of arrival (TOA) of the mobile's signal at each synchronized radio receiver and then subtracting one TOA from another to get an estimate of a TDOA. TOA estimates are basically the estimated signal propagation times from the mobile to a given base station. TDOA estimates are the differences in these estimated signal propagation times between base stations.

Various embodiments of the invention, in general, use both the received signal and a known transmitted reference signal to estimate multiple channel spectrums. The embodiments apply a subspace based algorithm on the estimated channel spectrums with an ideal channel response to determine the TOA estimate.

Again, generally speaking, various embodiments of the invention function as follows: A signal from a mobile phone, or other like wireless device, is received at each receiver, preferably in each base station. The received signal is down-converted to a baseband signal by a wideband digital receiver. The baseband signal is then sampled at least twice per symbol period by the synchronized analog-to-digital (A/D) converter and buffered with inserted Global Positioning System time stamps. A framer uses the sync word to determine the signal burst boundary. Once the sampled sequence is acquired by the framer, the sampled sequence is used along with a known transmit sequence to provide multiple snap shots of channel estimations. The channel spectrum information obtained from the snap shots of the estimated channel is used to form a unique Toeplitz data matrix for signal space projection. The matched channel rays are detected by solving a polynomial and then the intra-symbol delay is obtained. The intra-symbol delay is combined with the inter-symbol delay determined by the framer to estimate the TOA. The TOA estimations from different receivers are sent to a central place, usually a Central Office, where the TDOA estimations are determined from the TOA estimations. The TDOA estimations are used to determine the location of the mobile phone.

This concludes the general overview of various embodiments of the invention. Secondly, a detailed description of the structure of various embodiments of the invention is provided.

Figure 1:
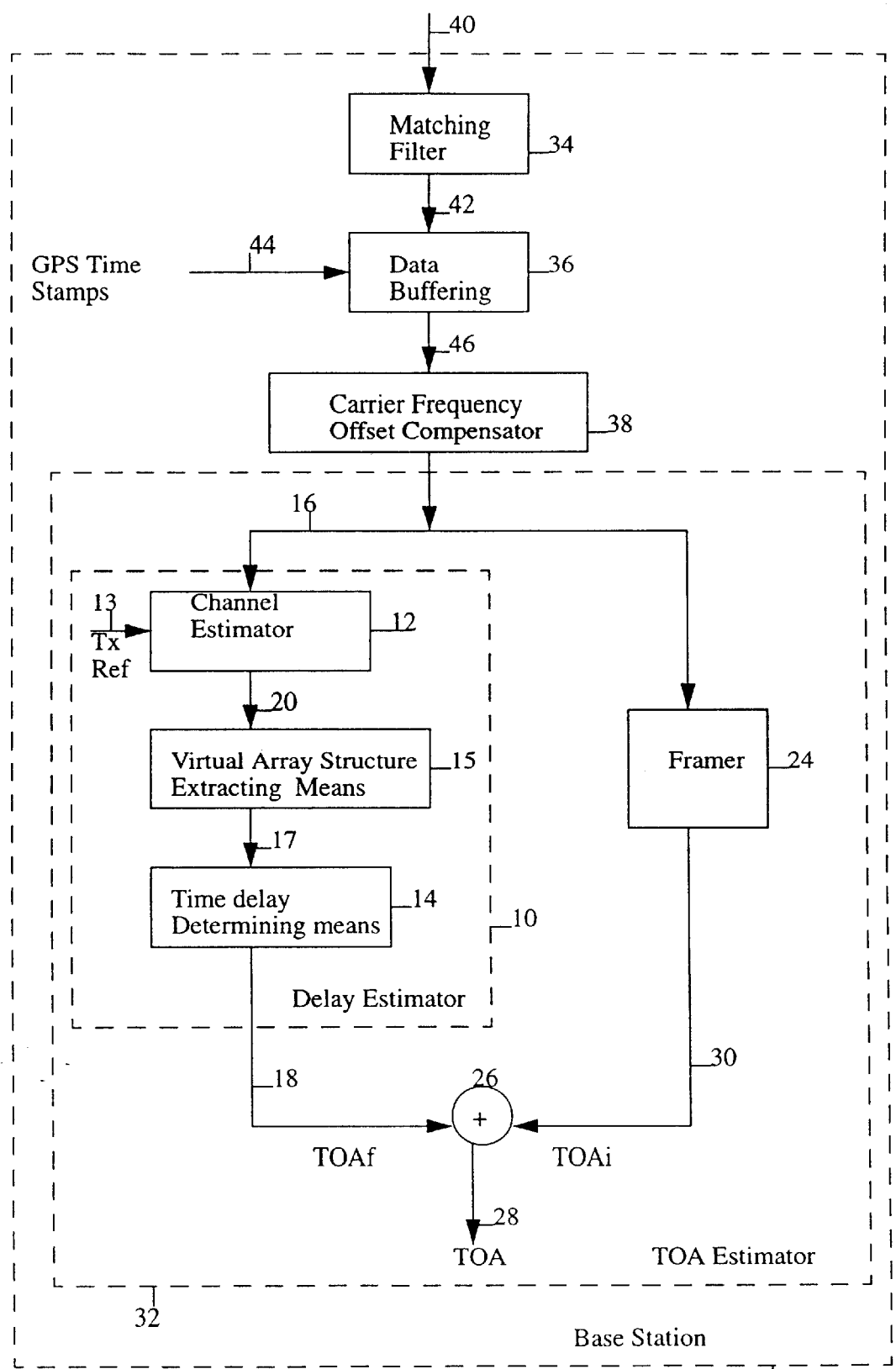
FIG. 1 is a block diagram of a base station including an embodiment of the invention.

FIG. 1 illustrates a system block diagram of an embodiment of the invention. The system includes a delay estimator 10 that includes a channel spectrum estimator 12, means for extracting a virtual array structure 15 and means for determining the time delay 14. The channel estimator 12 estimates a channel response 20 from a received signal 16. Preferably, the channel estimator 12 also uses a known reference signal 13, which may be the known transmitted signal. The extracting means 15 extracts the virtual array structure, preferably in the form of a data matrix 17. The data matrix is used to recover the signal space. The extracting means preferably includes means (not shown) for formulating the data matrix. The formulating means uses the estimated channel spectrum of one slot so that the data matrix representing the signal space includes delay and multipath information. The determining means 14 estimates a time delay, preferably an intra-symbol delay 18, using the data matrix 17.

Figure 6:
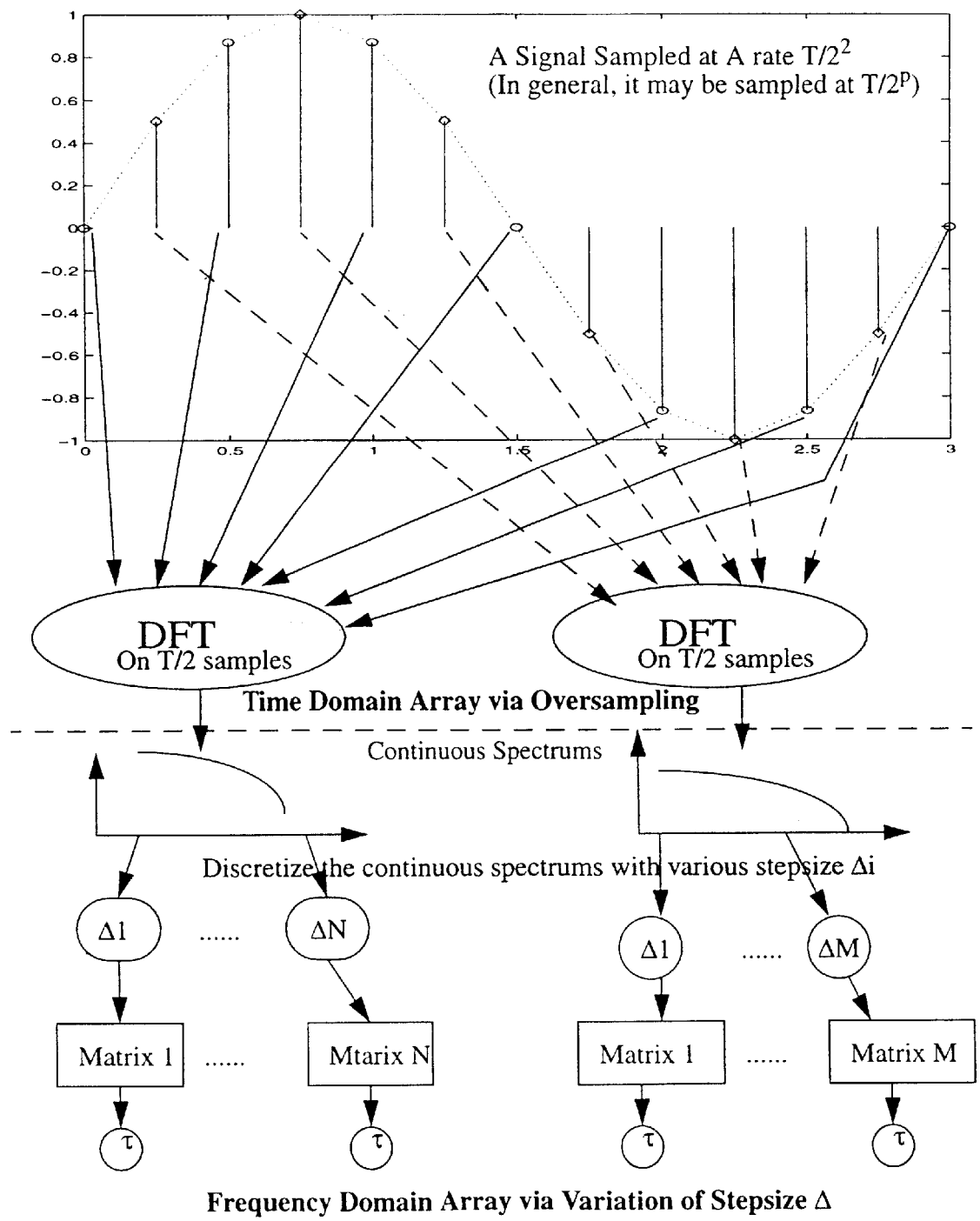
FIG. 6 is a schematic illustrating a virtual array structure according to an embodiment of the invention.

Referring to FIG. 6, given the transmitted signal x(t) at symbol rate T and received samples {y(kT/P)} with sampling rate T/P (P=$2^p$, p=1 is the Nyquist rate), p independent spectrum estimates of either equivalent baseband channel or physical channel can be obtained by p subsets of T/2 samples from {y(kT/P)}, where the mth estimate of spectrum is written as:

$$\hat{V}_m(w) = \exp\left(-i2\pi \frac{(m-1)T}{2^p} w\right) \sum_{k=-N_1}^{N_2} v\left(k\frac{T}{2} + \frac{(m-1)T}{2^p}\right) \exp(-iT\pi k w) \quad (1)$$

where m=1, 2, ..., p and v(n) are time-domain samples of the estimated channel. $N_1$ and $N_2$ are designed signal truncation point respectively. Multiple channel spectrum estimates can provide critical statistical information for subspace processing, which can improve system performance and robustness. Note that this is a continuous spectrum estimation and we can select any part of the spectrum as we are interested in.

With the knowledge of known sequence x(t) and the combined raisedcosine filter h(t), the receiver can keep a discretized copy of z(t)=x(t) ⊕ h(t), whose spectrum is denoted as Z(w). Suppose the Framer has aligned the known sequence with the received data sequence y($k_1$T/n), ..., y($k_2$T/n), whose spectrum $\hat{Y}$ (w) can be obtained by equation (1). If the known sequence has a repetitive pattern, like the shortened burst defined in IS-136, $\hat{Y}$ (w) will be the average of these repetitions. By discretizing both Z(w) and $\hat{Y}$ (w), as {Z(mΔ), m=0,±1, ±2, ..., ±M} and {ŷ(mΔ), m=0, ±1, ±2, ..., ±M}, the physical channel spectrum $\hat{V}$ (w) can be estimated as $\hat{V}$ (mΔ)=$\hat{Y}$ (mΔ)/(Z(mΔ); Δ is the stepsize in frequency, it is usually Z(w) dependent. The best choice for Δ is to make {z(mΔ)} have the smallest variance across the bandwidth. When Δ is fixed, M is the largest number to make Z(mΔ) meaningful as a denominator, therefore M is the dimension and much depends on the signal bandwidth. For IS-136, we choose Δ=1/(20T) and M=13. Let g(m)=$\hat{V}$ (0) $\hat{V}$ (m)* and g(-m)=$\hat{V}$ (0)* $\hat{V}$ (-m) for m=0, 1, 2, ..., M. By defining $$R(m) = \frac{g(m) + g(-m)}{2}, m = 0, 1, 2, \ldots, M$$

the data matrix is finally structured as a Hermitian Toeplitz as below:

$$R1 = \begin{bmatrix} R(0) & R(1) & R(2) & \ldots & R(M) \\ R(1)^1 & R(0) & R(1) & \ldots & R(M-1) \\ R(2)^1 & R(1)^1 & R(0) & \ldots & R(M-2) \\ \ldots & \ldots & \ldots & & \ldots \\ R(M)^1 & R(M-1)^1 & R(M-2)^1 & \ldots & R(0) \end{bmatrix}$$

This matrix is very special for TOA estimation and is the input for SVD. It has several important properties which guarantees the high resolution accuracy of the TOA estimation. Even though the choice of fixed stepsize Δ will not affect the result, the Polynomial Solver need Δ as a parameter to provide a correct TOA estimation. Proper selection of Δ may bring some gain when the spectrum of the known sequence is not flat across the bandwidth.

Preferably, the delay estimator 10 is used with a framer 24 and a summer 26 to produce a TOA estimate 28. The framer 24 estimates the inter-symbol delay 30 using the received signal 16. The summer 26 combines the inter-symbol-delay 30 and the intra-symbol delay 18 to produce the TOA estimate 28. Collectively, the delay estimator 10, the framer 24 and the summer 26 form a TOA estimator 32.

Preferably, the TOA estimator 32 is used with a matched filter 34, a data buffer 36 and a carrier frequency offset compensator 38. The matched filter 32 matched filters an input signal 40 to produce a filtered signal 42. The data buffer 36 buffers the filtered signal 42 and adds a global positioning system time stamp 44 to the filtered signal 42 to produce a buffered signal 46. The carrier frequency offset compensator 38 compensates for carrier offset in the buffered signal 46 to produce the received signal 16. Taken together, the matched filter 34, the data buffer 36, the carrier frequency offset compensator 38 and the TOA estimator 32 form a base station 48.

Figure 2:
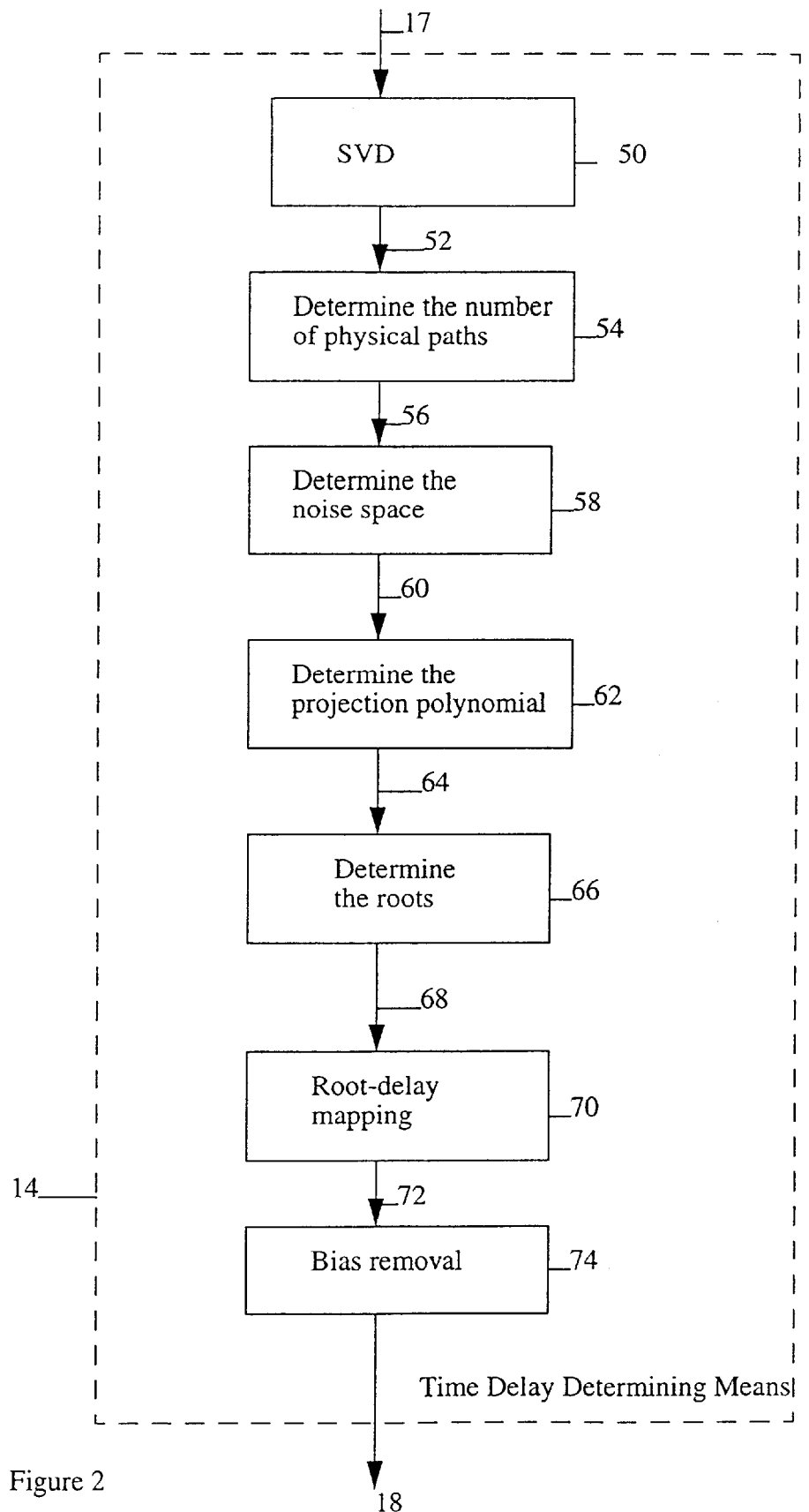
FIG. 2 is a block diagram illustrating the embodiment of FIG. 1 in further detail.

FIG. 2 is a block diagram further illustrating the time delay determining means 14 according to an embodiment of the invention. The time delay determining means preferably includes the following:

means 50 for performing singular value decomposition on the data matrix 17;
  means 54 for detecting automatically, based on the singular value decomposition results 52, the number of physical paths 56;
  means 58 for determining a noise space 60 using the number of physical paths 56;
  means 62 for determining a projection polynomial 64 using the noise space 60;
  means 66 for determining a least one root pair 68 by solving the projection polynomial 64;
  means 70 for mapping the roots 68 to determine a rough time delay estimate 72. Preferably, the mapping means comprises:
    means (not shown)for selecting, for each root pair, the constituent root closest to the unit circle when plotted on the complex plane;
    means (not shown)for determining, for each constituent root selected, a delay according to the formula:

$$\tau = \min\left[\frac{\left|\arctan\frac{\text{Re}(r_{M+1-i})}{\text{im}(r_{M+1-i})}\right|}{2\pi\Delta}\right]$$

for each physical path i, where $\pi$=TOAf, TOAf is a so called intra-symbol delay, r=roots, Re=real part, im=imaginary and $\Delta$ is determined when forming the data matrix. Preferably, $\Delta$ is chosen to make the spectrum sequence having the smallest variance across the bandwidth.
    means (not shown)for determining the rough time delay estimate by selecting the shortest delay;
  means 74 for estimating the time delay 18 by removing bias in the rough time delay estimate 72. Preferably, the estimating means comprises means (not shown) for determining the time delay estimate by modifying the rough time delay using a predetermined, empirical multipath compensation factor.

This concludes the detailed description of the structure of various embodiments of the invention. Thirdly, a detailed description of the operation of various embodiments of the invention is provided.

Figure 3:
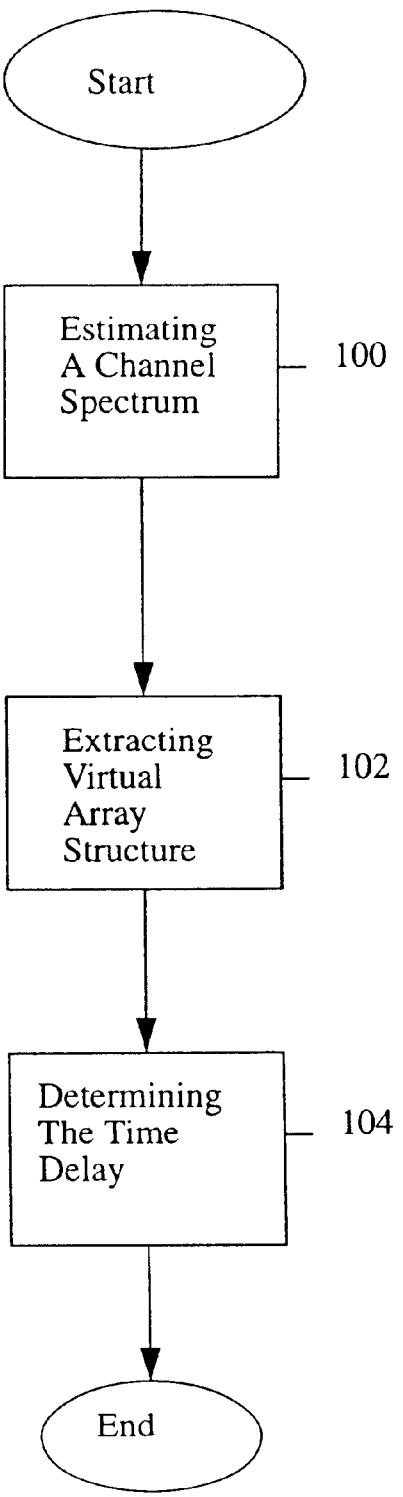
FIG. 3 is a flowchart illustrating a method for estimating a time delay according to an embodiment of the invention.

FIG. 3 is a flowchart illustrating a time delay estimation method according to an embodiment of the invention. The time delay estimation method includes the following steps:
  estimating a channel spectrum from a received signal and a known reference signal (step 100). Preferably, the channel spectrum is continuous.
  extracting a virtual array structure from the estimated channel spectrum (step 102); and
  determining the time delay using the virtual array structure (step 104).
Preferably, the embodiment further includes the steps of oversampling the received signal to produce a time domain virtual array (not shown); and
  determining the time delay using the virtual array structure and the time domain virtual array (not shown).
Also preferably,
  the embodiment further includes the step of estimating a plurality of continuous channel spectrums (not shown); and
  wherein the extracting step uses the plurality of continuous channel spectrum estimations to determine the virtual array structure.

Figure 4:
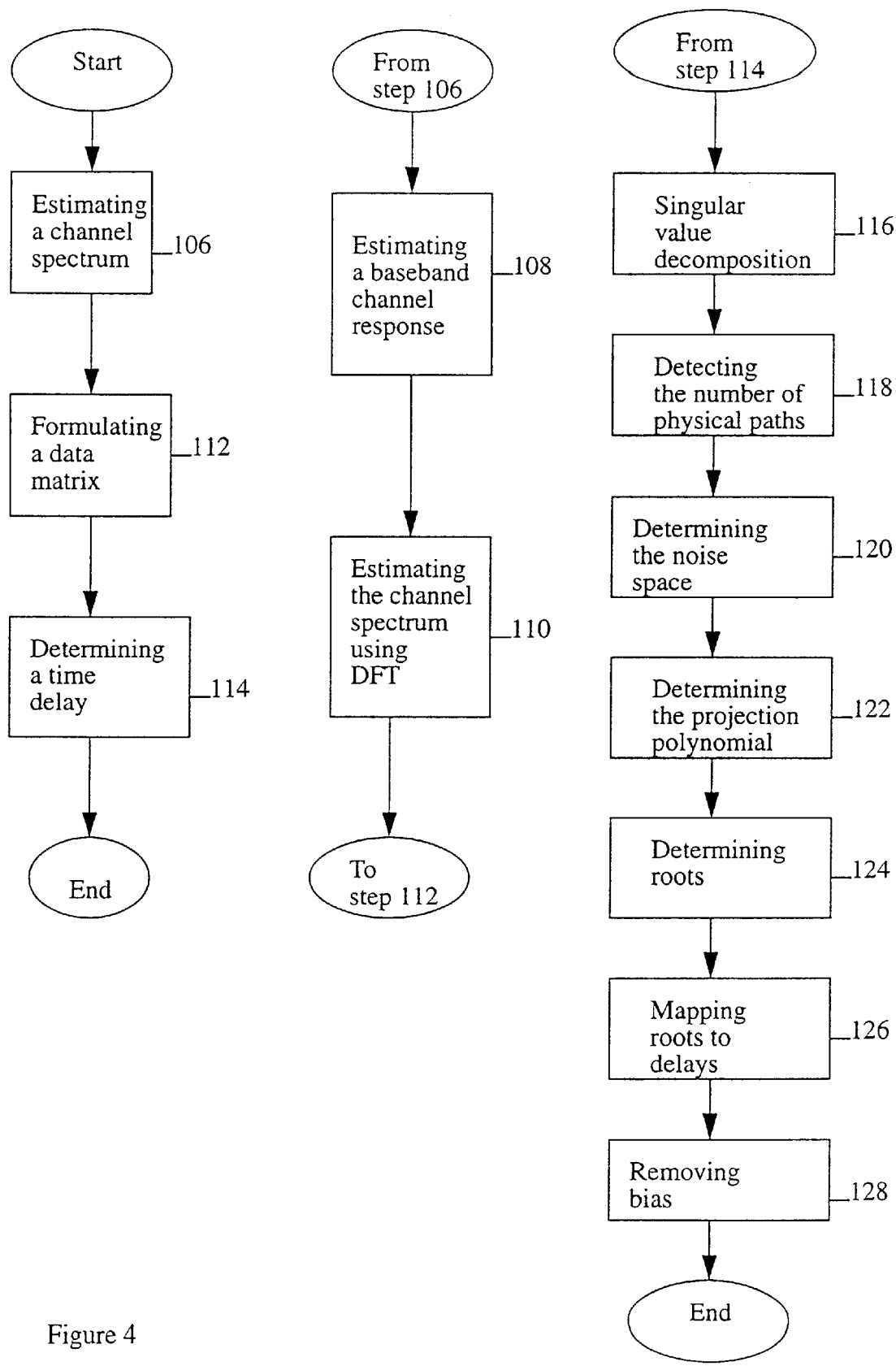
FIG. 4 is a flowchart illustrating a method for estimating a time delay according to another embodiment of the invention.

FIG. 4 is a flowchart illustrating a method for estimating a time delay according to another embodiment of the invention. The time delay estimation method includes the following steps:
  estimating a channel spectrum from a received signal and a known reference signal (step 106). Preferably, the channel spectrum is continuous. Also preferably, the channel spectrum estimation step includes the steps of:
    estimating a baseband channel response using the received signal and the known reference signal (step 108);
    estimating the continuous channel spectrum using a Discrete
  Fourier Transform of the baseband channel response (step 110).
  formulating a data matrix using the estimated channel spectrum (step 112). Preferably the step includes constructing a signal space using the estimated channel spectrum and one slot so that the signal space includes delay and multipath information (not shown). Also preferably, the signal space is represented as a Hermitian Toeplitz matrix.
  determining a time delay estimate using the data matrix (step 114). Preferably, this step includes the steps of:
    performing singular value decomposition on the data matrix (step 116);
    detecting automatically, based on the singular value decomposition results, the number of physical paths (step 118);
    determining a noise space using the number of physical paths (step 120);
    determining a projection polynomial using the noise space (step 122);
    determining a least one root pair by solving the projection polynomial (step 124). Preferably, the projection polynomial is solved using Kuhn's sandwich method.
    mapping the roots to determine a rough time delay estimate (step 126). Preferably, this step includes the steps of (not shown):
      for each root pair, selecting the constituent root closest to the unit circle when plotted on the complex plane;
      for each constituent root selected, determining a delay according to the formula:

$$\tau = \min\left[\frac{\left|\arctan\frac{\text{Re}(r_{M+1-i})}{\text{im}(r_{M+1-i})}\right|}{2\pi\Delta}\right]$$

for each physical path i, where $\tau$=TOAf, r=roots, Re=real part, im=imaginary and $\Delta$ is determined when forming the data matrix. Preferably, $\Delta$ is chosen to make the spectrum sequence have the smallest variance across the bandwidth.

determining the rough time delay estimate by selecting the shortest delay.

estimating the time delay by removing bias in the rough time delay estimate (step 128). Preferably, this step includes determining the time delay estimate by modifying the rough time delay using a predetermined, empirical multipath compensation factor (not shown).

Depending on the system being implemented, the known signal may be one of the following:

the known reference signal may be a shortened burst or sync word in norm burst in an IS-136 system.

the known reference signal may be a voice channel training/synchronization burst or a random access channel synchronization word in a GSM system.

the known reference signal may be an Access Channel preamble or a spreading sequence in an CDMA system.

the known reference signal may be a Wiegand data precursor in an AMPS system.

Figure 5:
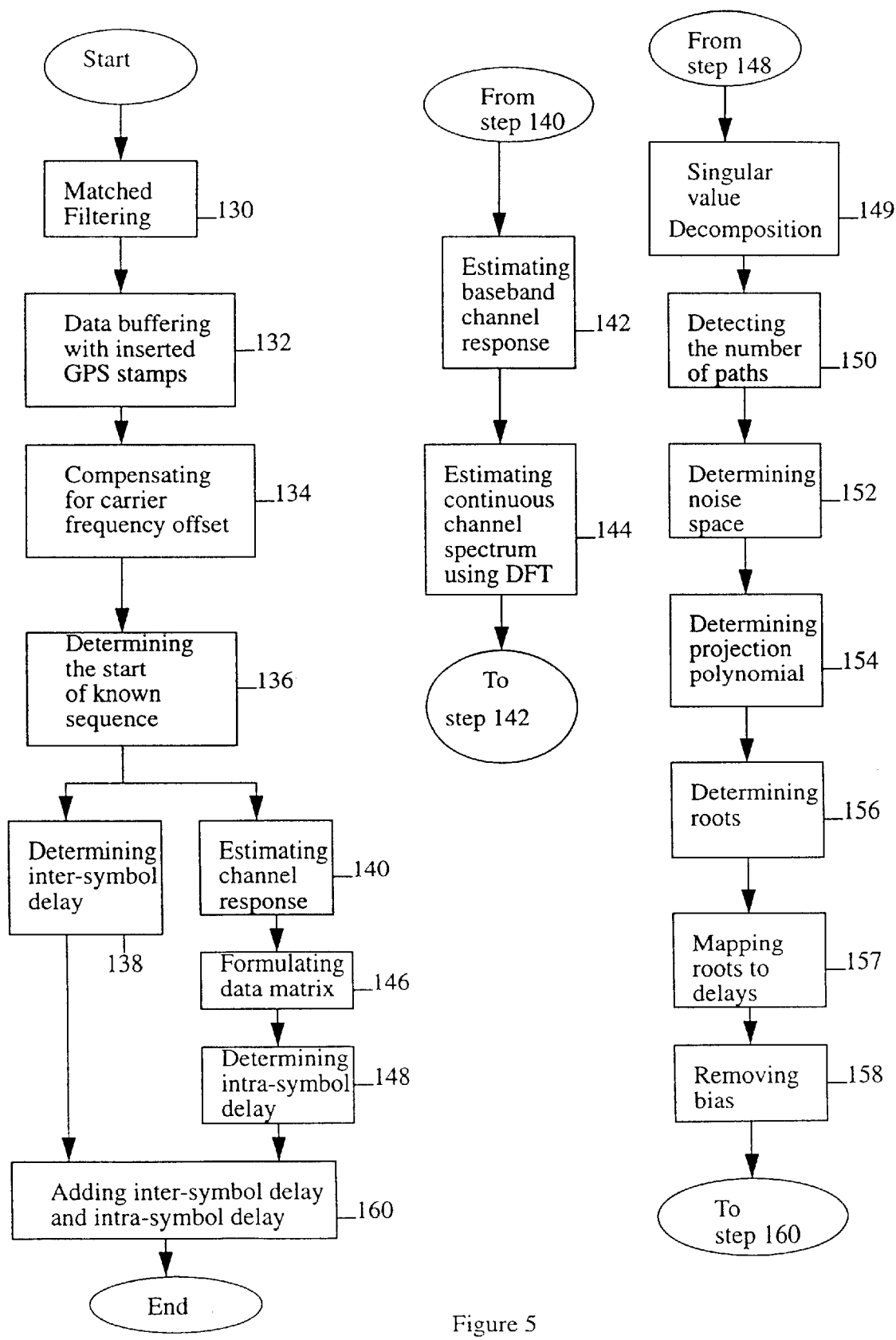
FIG. 5 is a flowchart illustrating a time of arrival estimation method according to another embodiment of the invention.

FIG. 5 is a flowchart illustrating a time of arrival estimation method according to an embodiment of the invention. The time of arrival estimation method includes the following steps:

matched filtering an input signal to produce a matched filtered signal (step 130);

buffering the matched filtered signal and adding global positioning system time stamps to produce a buffered signal (step 132);

compensating for the carrier offset in the buffered signal to produce a received signal (step 134);

determining the start of a shortened burst signal in the received signal using a framer (step 136);

at the start of the shortened burst, determining the inter-symbol delay by framing the shortened burst (step 138);

at the start of the shortened burst, estimating a channel response using the received signal and a known reference signal (step 140). Preferably, this step includes the steps of:

estimating a baseband channel response using the received signal and the known reference signal (step 142); and estimating the continuous channel spectrum using a Discrete Fourier Transform of the baseband channel response (step 144).

formulating a data matrix using the estimated channel spectrum (step 146). Preferably, this step includes constructing a signal space using the estimated channel spectrum and one slot so that the signal space includes delay and multipath information. Also preferably, the signal space is represented as a Hermitian Toeplitz matrix.

determining an intra-symbol delay estimate using the data matrix (step 148). Preferably, this step includes the steps of:

performing singular value decomposition on the data matrix (step 149);

detecting automatically, based on the singular value decomposition results, the number of physical paths (step 150);

determining a noise space using the number of physical paths (step 152);

determining a projection polynomial using the noise space (step 154);

determining a least one root pair by solving the projection polynomial (step 156). Preferably, the projection polynomial is solved using Kuhn's sandwich method.

mapping the roots to determine a rough intra-symbol delay estimate (step 157). Preferably, this step includes the steps of (not shown):

for each root pair, selecting the constituent root closest to the unit circle when plotted on the complex plane;

for each constituent root selected, determine a delay according to the formula:

$$\tau = \min\left[\frac{\left|\arctan\frac{\text{Re}(r_{M+1-i})}{\text{im}(r_{M+1-i})}\right|}{2\pi\Delta}\right]$$

for each physical path i, where $\tau$=TOAF, r=roots, Re=real part, im=imaginary and $\Delta$ is determined when forming the data matrix. Preferably, $\Delta$ is chosen to make the spectrum sequence have the smallest variance across the bandwidth.

determine the rough intra-symbol delay estimate by selecting the shortest delay.

estimating the intra-symbol delay by removing bias in the rough intra-symbol delay estimate (step 158). Preferably, this step includes determining the intra-symbol delay estimate by modifying the rough intra-symbol delay using a predetermined, empirical multipath compensation factor.

determining a time of arrival by adding the inter-symbol delay and the intra-symbol delay (step 160).

This concludes the detailed description of the operation of various embodiments of the invention. Fourthly, a detailed description of the advantages of various embodiments of the invention is provided.

Traditionally, correlation based algorithms are a conventional way to do TOA or propagation delay estimation. These traditional time-domain algorithms, however, have difficulty distinguishing closely fractionally-spaced multipaths/multirays. Consequently, traditional correlation based algorithms may estimate TOA with limited accuracy in multipath environments. In contrast, generally speaking, the present invention estimates the channel using a known sequence and uses channel spectrum information to form a unique Toeplitz data matrix so that closely spaced multirays are effectively distinguished.

As outlined in the Background section, in general, there are two approaches to do TDOA estimation. One is to use cross-correlation on two received signals from two different radios to directly estimate TDOA. The other is to use auto-correlation on the received signal with the known transmitted signal as the reference to estimate TOA in each radio locally and subtract one TOA from the other to get TDOA. For a given signal bandwidth and signal to noise ratio, generally speaking, traditional correlation based algorithm performance can be improved as observation time gets longer. In a multipath environment, however, longer observation time can not effectively improve performance for the correlation based algorithms. In contrast, the present invention can function effectively in a multipath environment to provide higher resolution TOA or propagation delay estimates.

Location determination based on TOA estimation techniques may also offer the following advantages in addition to E911:

child tracking criminal tracking roadside assistance vehicle fleet management, for example, rental and truck companies direction finding traffic information location based billing or advertisements While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method for estimating a time delay, the method comprising the steps of:
    a. estimating a channel spectrum from a received signal and a known reference signal;
    b. formulating a unique data matrix using the estimated channel spectrum; and
    c. determining a time delay estimate using the data matrix, wherein step (a) comprises the steps of
        a. estimating a baseband channel response using the received signal and the known reference signal; and
        b. estimating the continuous channel spectrum using a Discrete Fourier Transform of the baseband channel response.

2. A method for estimating a time delay, the method comprising the steps of:
    a. estimating a channel spectrum from a received signal and a known reference signal;
    b. formulating a unique data matrix using the estimated channel spectrum; and
    c. determining a time delay estimate using the data matrix, wherein step (b) comprises the step of constructing a signal space using the estimated channel spectrum and one slot so that the signal space includes delay and multipath information.

3. The method recited in claim 2 wherein step (a) comprises the step of representing the signal space as a Hermitian Toeplitz matrix.

4. A method for estimating a time delay, the method comprising the steps of:
    a. estimating a channel spectrum from a received signal and a known reference signal;
    b. formulating a unique data matrix using the estimated channel spectrum; and
    c. determining a time delay estimate using the data matrix, wherein step (c) comprises the steps of
        a. performing singular value decomposition on the data matrix;
        b. detecting automatically, based on the singular value decomposition results, the number of physical paths;
        c. determining a noise space using the number of physical paths;
        d. determining a projection polynomial using the noise space;
        e. determining at least one root pair by solving the projection polynomial;
        f. mapping the roots to determine a rough time delay estimate; and
        g. estimating the time delay by removing bias in the rough time delay estimate.

5. The method recited in claim 4 wherein step (e) comprises the step of solving the projection polynomial using Kuhn's sandwich method.

6. The method recited in claim 4 wherein step (f) comprises the steps of:
    a. for each root pair, selecting the constituent root closest to the unit circle when plotted on the complex plane;
    b. for each constituent root selected, determining a delay according to the formula:

$$\tau = \min\left[\frac{\left|\arctan\frac{\mathrm{Re}(r_{M+1-i})}{\mathrm{im}(r_{M+1-i})}\right|}{2\pi\Delta}\right]$$

for each physical path i, where $\tau$=TOAF, r=roots, Re=real part, im=imaginary and $\Delta$ is predetermined;
    c. determining the rough time delay estimate by selecting the shortest delay.

7. The method recited in claim 4 wherein step (g) comprises the step of determining the time delay estimate by modifying the rough time delay using a predetermined, empirical multipath compensation factor.

8. A method for estimating a time delay, the method comprising the steps of:
    a. estimating a channel spectrum from a received signal and a known reference signal;
    b. formulating a unique data matrix using the estimated channel spectrum; and
    c. determining a time delay estimate using the data matrix, wherein the known reference signal in step (a) is a shortened burst or sync word in norm burst in an IS-136 system.

9. A method for estimating a time of arrival, the method comprising the steps of:
    a. matched filtering an input signal to produce a matched filtered signal;
    b. buffering the matched filtered signal and adding global positioning system time stamps to produce a buffered signal;
    c. compensating for the carrier offset in the buffered signal to produce a received signal;
    d. determining the start of a shortened burst signal in the received signal using a framer;
    e. at the start of the shortened burst, determining the inter-symbol delay by framing the shortened burst;
    f. at the start of the shortened burst, estimating a channel response using the received signal and a known reference signal;
    g. formulating a data matrix using the estimated channel spectrum;
    h. determining an intra-symbol delay estimate using the data matrix; and
    j. determining a time of arrival by adding the inter-symbol delay and the intra-symbol delay.

10. The method recited in claim 9 wherein step (f) comprises the steps of
    a. estimating a baseband channel response using the received signal and the known reference signal;
    b. estimating the continuous channel spectrum using a Discrete Fourier Transform of the baseband channel response.

11. The method recited in claim 9 wherein step (g) comprises the step of constructing a signal space using the estimated channel spectrum and one slot so that the signal space includes delay and multipath information.

12. The method recited in claim 9 wherein step (a) comprises the step of representing the signal space as a Hermitian Toeplitz matrix.

13. The method recited in claim 9 wherein step (h) comprises the steps of
   a. performing singular value decomposition on the data matrix;
   b. detecting automatically, based on the singular value decomposition results, the number of physical paths;
   c. determining a noise space using the number of physical paths;
   d. determining a projection polynomial using the noise space;
   e. determining a least one root pair by solving the projection polynomial;
   f. mapping the roots to determine a rough intra-symbol delay estimate; and
   g. estimating the intra-symbol delay by removing bias in the rough intra-symbol delay estimate.

14. The method recited in claim 13 wherein step (e) comprises the step of solving the projection polynomial using Kuhn's sandwich method.

15. The method recited in claim 13 wherein step (f) comprises the steps of:
   a. for each root pair, selecting the constituent root closest to the unit circle when plotted on the complex plane;
   b. for each constituent root selected, determine a delay according to the formula:

$$\tau = \min\left[\frac{\left|\arctan\frac{\text{Re}(r_{M+1-i})}{\text{im}(r_{M+1-i})}\right|}{2\pi\Delta}\right]$$

for each physical path i, where τ=TOAf, r=roots, Re=real part, im=imaginary and Δ is predetermined.
   c. determine the rough intra-symbol delay estimate by selecting the shortest delay.

16. The method recited in claim 13 wherein step (g) comprises the step of determining the intra-symbol delay estimate by modifying the rough intra-symbol delay using a predetermined, empirical multipath compensation factor.

17. A system for estimating a time delay, the system comprising:
   a. a channel spectrum estimator for estimating a channel spectrum from a received signal and a known reference signal;
   b. means for extracting a virtual array structure from the estimated channel spectrum; and
   c. means for determining the time delay using the virtual array structure, wherein the extracting means comprises means for formulating a data matrix representing a signal space, the formulating means using the estimated channel spectrum and one slot so that the data matrix representing the signal space includes delay and multipath information.

18. A system for estimating a time delay, the system comprising:
   a. a channel spectrum estimator for estimating a channel spectrum from a received signal and a known reference signal;
   b. means for extracting a virtual array structure from the estimated channel spectrum; and
   c. means for determining the time delay using the virtual array structure, wherein the determining means comprises:
      a. means for performing singular value decomposition on the data matrix;
      b. means for detecting automatically, based on the singular value decomposition results, the number of physical paths;
      c. means for determining a noise space using the number of physical paths;
      d. means for determining a projection polynomial using the noise space;
      e. means for determining at least one root pair by solving the projection polynomial;
      f. means for mapping the roots to determine a rough intra-symbol delay estimate; and
      g. means for estimating the intra-symbol delay by removing bias in the rough time delay estimate.

19. The system recited in claim 18,
   a. wherein the mapping means comprises:
      i. means for selecting, for each root pair, the constituent root closest to the unit circle when plotted on the complex plane;
      ii. means for determining, for each constituent root selected, a delay according to the formula:

$$\tau = \min\left[\frac{\left|\arctan\frac{\text{Re}(r_{M+1-i})}{\text{im}(r_{M+1-i})}\right|}{2\pi\Delta}\right]$$

for each physical path i, where τ=TOAF, r=roots, Re=real part, im=imaginary and Δ is predetermined.
      iii. means for determining the rough time delay estimate by selecting the shortest delay; and
   b. wherein the estimating means comprises:
      i. means for determining the time delay estimate by modifying the rough time delay using a predetermined, empirical multipath compensation factor.

20. The system recited in claim 19, wherein the time delay is an intra-symbol delay.

21. The system recited in claim 20 further comprising:
   a. a framer for estimating a inter-symbol delay using the received signal; and
   b. a summer for combining the inter-symbol-delay and the intrasymbol delay to produce a time of arrival estimate.

22. The system recited in claim 21, the system further comprising:
   a. a matched filter for matched filtering an input signal to produce a filtered signal;
   b. a data buffer for buffering the filtered signal and for adding a global positioning system time stamp to the filtered signal to produce a buffered signal; and
   c. a carrier frequency offset compensator for compensating for carrier offset in the buffered signal to produce the received signal.

* * * * *